June 10, 1930.  R. T. HURLEY  1,762,989
SPARK PLUG
Filed March 15, 1923
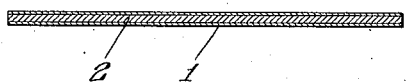
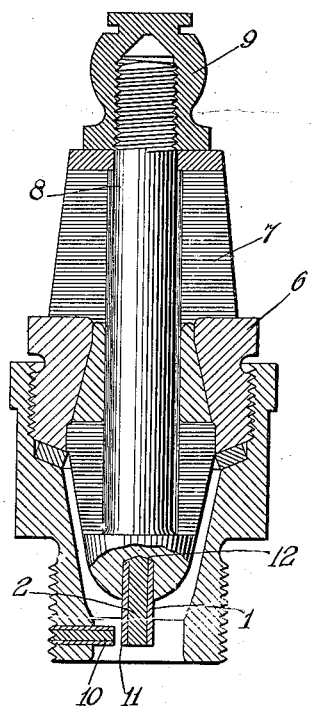
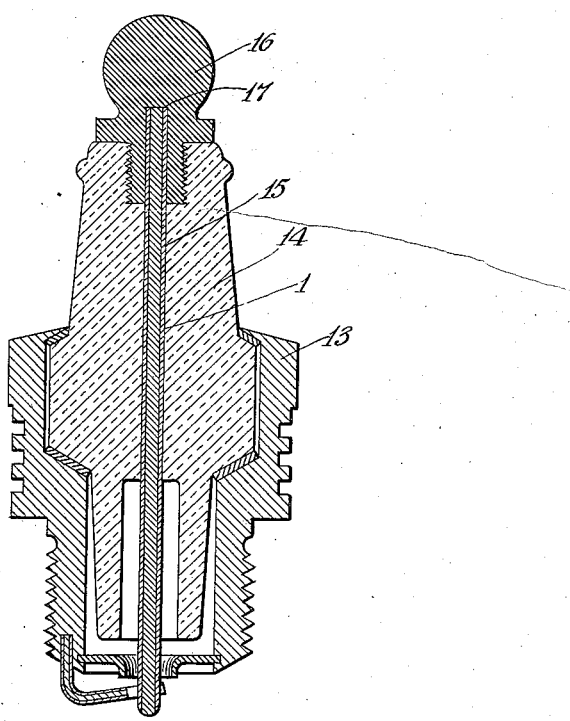
Roy T. Hurley  Inventor
By his Attorneys
Kenyon & Kenyon Patented June 10, 1930

1,762,989

UNITED STATES PATENT OFFICE

ROY T. HURLEY, OF DOBBS FERRY, NEW YORK, ASSIGNOR TO THE B. G. CORPORATION, A CORPORATION OF NEW YORK

SPARK PLUG

Application filed March 15, 1923. Serial No. 625,411.

My invention relates to improvements in electrodes for spark plugs. It has for its object the providing of an electrode which will cause the spark plug in which it is used to operate more efficiently by providing that the heat accumulating at the sparking points will be effectively carried off, at the same time retaining the necessary durability and heat resisting qualities. Heretofore the necessity that electrodes must possess sufficient heat resisting qualities has required that they be constructed of metal possessing such properties. The result has been that electrodes made from heat resisting metals rather than heat conducting metals have caused an excessive amount of heat to accumulate at the sparking point. I have discovered that if the electrode be composed of an outer layer of metal possessing heat resisting properties and an inner core of metal of heat conducting properties, such as copper, and if such core extend entirely through the electrode from a point adjacent to the sparking point entirely through the outer layer and preferably to a point of contact with some other heat conducting substance away from the sparking point the excessive heat produced at the sparking points will be properly lead off. The outer layer of heat resisting metal at the same time will give to the electrode the necessary heat resisting properties required. I am aware that electrodes have been made of a combination of heat resisting metals and heat conducting metals, such as nickel and copper but such electrodes have not been successful for the reason that in such instances the heat conducting element has not extended from the sparking point entirely through the electrodes so that the heat could be withdrawn from the sparking point through the heat resisting metal. Where in the prior electrodes, the heat conducting or copper element does not extend entirely through the surrounding heat resisting element the said heat conducting element rapidly becomes surcharged with heat with the result that sufficient heat will not be led off from the sparking point. In my invention the heat conducting element extends from a point adjacent to the sparking point of the electrode and runs entirely through the electrode and through the surrounding layer of heat resisting metal, preferably into contact with an outside heat conducting substance. In the former electrodes in which a combination of a heat resisting metal and a heat conducting metal have been used, such electrodes have been mechanically assembled or made by various machine operations. In no instance, as far as I know, has such a combination electrode been made from a wire. The combination wire or my electrodes can be made from a nickel billet having a copper core and worked hot or cold by the usual method in the manufacture of wire. My electrode, although a combination of two metals can be made up for approximately the cost of an ordinary wire electrode and it requires no machine work.

In the accompanying specification and drawings I describe and show my invention as embodied in its preferred form but it is to be understood that I am not limiting myself to the form shown, the scope of my invention being defined in the claims.

Referring to the drawings Fig. 1 is a perspective view of a section of wire preferably nickel, provided with a core of copper.

Fig. 2 is a longitudinal sectional view of the same section of wire.

Fig. 3 is an enlarged longitudinal sectional view of a section of my combination wire, which has been upset and formed for use in a spark plug where the electrode is sealed by the use of a gasket and a threaded nut.

Fig. 4 is a sectional elevation of a spark plug, particularly designed for use in aviation engines, embodying my new form of electrode.

Fig. 5 is a sectional view of a spark plug more particularly adapted for automobile purposes, likewise showing my invention.

Referring to the drawings Figs. 1 and 2 show a section of the wire from which my electrodes can be formed. The wire is composed of an outer layer 1 made of some heat resisting metal, preferably nickle, and an inner core 2 of a heat conducting metal preferably copper running entirely through the length of wire. The electrode wire can be made as previously described. The wire may be in any length desired and can subsequently be cut into sizes and portions for use in particular spark plugs.

Fig. 3 illustrates how the electrode while in its wire form may be upset or rolled into the shape and form desired. The section of wire electrode, as shown in Fig. 3, has been upset in order to form the collar 5 and also rolled to form the screw threads 3. As illustrated in Fig. 3 the inner core will take the form and shape upset or rolled upon the outer layer.

In Fig. 4 my invention is shown as used in a spark plug adapted for aviation purposes. In this form of spark plug a very short electrode is used. The spark plug is composed of a steel shell 6 having mica insulation 7 surrounding the central steel spindle 8. Electrical contact is made through a brass head 9 screwed upon the head of the steel spindle 3. At the base of the steel spindle there is fixed a short electrode composed of an outer layer 1 of nickel and having a copper core 2. The other electrode 10 may also preferably be composed of an outer layer of nickel and an inner core of copper. The inner copper core 2 of the central electrode extends from adjacent to the sparking point at 11 entirely through the electrode and through the outer layer 1 made of heat resisting metal and forms a contact at 12 with the steel spindle 8. Thus the heat accumulated at the sparking point 11 can flow through the heat conducting copper core 2 to the steel spindle 8 and be there diffused. At the same time the outer layer 1 of heat resisting metal provides the necessary heat resisting surface for the electrode.

Fig. 5 illustrates the use of my improved electrode in the ordinary form of spark plug designed for automobile uses. The electrode extends almost the entire length of the spark plug. The spark plug in this figure is composed of a steel shell 13 together with the material 14 adapted to insulate the central electrode 15. Electrical contact is made through the brass knob 16 which screws into the insulation 14 around the head of the electrode 15. The electrode 15 is composed throughout its entire length of an outer layer 1 made of nickel or other heat resisting metal and of an inner core 2 of copper. The copper core 2 extends throughout the length of the electrode from a point adjacent the sparking point upward through the outer layer of heat resisting metal and forms a contact at 17 with the brass knob 16. No excessive heat can accumulate at the sparking point as it is readily withdrawn through the copper core and diffused through the contact at 17 into the head 16. At the same time the outer layer of nickel provides the electrode with a heat resisting surface. I have described my improved electrode as used in two different forms of spark plugs, in the one a short electrode is used, and in the other an electrode extending through the length of the spark plug. As can readily be seen my invention is not limited to use in connection with such particular spark plugs but may be used in a great number and variety of spark plugs, and it is not my intention to limit my invention to any particular form of spark plug or length of electrode, provided only that the electrode is composed of an outer layer of heat resisting metal and an inner core of heat conducting metal extending from adjacent the sparking point through the electrode or through the outer layer, and preferably in the case of the central electrode making contact with some other heat conducting substance.

In the accompanying claims I have described my electrode as being a wire electrode, meaning thereby, an electrode formed or cut from a section of wire as previously described, as distinguished from a machine made or mechanically assembled electrode.

Having thus described my invention, what I claim as new and desire to secure by Letters Patent of the United States is:—

1. An electrode for a spark plug comprising a composite wire composed of an outer sheath of heat-resisting metal and a core of a good heat-conducting metal, said core being co-extensive in length with the outer sheath.

2. In a spark plug of the character described, spaced electrodes supported thereby in sparking relation, one of the electrodes comprising an outer sheath of heat-resisting metal and a core of a good heat-conducting metal, which core is co-extensive in length with the electrode and extends uninterruptedly from the sparking area to form a good heat-conducting path from that point to the end of the electrode remote from said sparking area.

3. In a spark plug of the character described, spaced electrodes supported thereby in sparking relation each of said electrodes comprising an outer sheath of heat-resisting metal and a core of a good heat-conducting metal, said core being co-extensive in length with the electrode and extending uninterruptedly from the sparking area to form a good heat-conducting path from that point to the end of each electrode remote from said sparking area.

4. In a spark plug of the character described, spaced electrodes supported thereby, a heat-radiating member forming a part of the plug and in contact with that end of one of said electrodes remote from the sparking area, said last mentioned electrode comprising an outer sheath of heat-resisting metal and a core of a good heat-conducting metal, which core is co-extensive in length with said outer sheath and extends uninterruptedly from the sparking area into contact with said heat-radiating member.

5. In a spark plug of the character described, spaced electrodes supported thereby in sparking relation, a plurality of heat-radiating members forming parts of the plug, each of said members being in contact with one of said electrodes at its end remote from the sparking area, each of said electrodes comprising an outer sheath of heat-resisting metal and a core of a good heat-conducting metal, which core is co-extensive in length with said outer sheath and extends uninterruptedly from the sparking area into contact with the respective heat-radiating members.

In testimony whereof, I have signed my name to this specification.

ROY T. HURLEY.